United States Patent
Finkelstein

(10) Patent No.: US 7,574,535 B2
(45) Date of Patent: Aug. 11, 2009

(54) PREVENTION OF INADVERTENT DATA SYNCHRONIZATION TO AND FROM REMOVABLE MEMORY SOURCES ON A HANDHELD CONNECTED DEVICE

(75) Inventor: Jeffrey Finkelstein, San Francisco, CA (US)

(73) Assignee: Palm, Inc., Sunnyvale, CA (US)

( * ) Notice: Subject to any disclaimer, the term of this patent is extended or adjusted under 35 U.S.C. 154(b) by 103 days.

(21) Appl. No.: 11/849,223

(22) Filed: Aug. 31, 2007

(65) Prior Publication Data

US 2009/0063711 A1    Mar. 5, 2009

(51) Int. Cl.
  G06F 3/00   (2006.01)
  H04L 7/04   (2006.01)
  H04L 9/32   (2006.01)

(52) U.S. Cl. .............................. 710/15; 710/17; 726/2; 726/17; 726/21

(58) Field of Classification Search .................. 710/15, 710/17; 726/2, 17, 21
See application file for complete search history.

(56) References Cited

U.S. PATENT DOCUMENTS

| | | | | |
|---|---|---|---|---|
| 2005/0169467 | A1* | 8/2005 | Risan et al. | 380/201 |
| 2007/0239849 | A1* | 10/2007 | Robbin et al. | 709/217 |
| 2009/0006796 | A1* | 1/2009 | Chang et al. | 711/163 |

* cited by examiner

Primary Examiner—Alford W Kindred
Assistant Examiner—David E Martinez
(74) Attorney, Agent, or Firm—Fenwick & West LLP

(57) ABSTRACT

A method is disclosed for continuously synchronizing data to and from a removable memory source connected to a user's handheld device. When the memory source is inserted into the handheld device, the device queries the memory source to determine whether the memory source is associated with the device or with an online service associated with the device. Upon determining that the memory source is associated with the device, the device exposes the memory source to the online service and allows read and write access to the online service. Upon determining that the memory source is not associated with the device, the device further checks to determine whether the user seeks to associate the memory source with the device. If the user chooses not to do so, the user is allowed to view and modify the contents of the memory source without synchronizing data to and from the online service.

15 Claims, 3 Drawing Sheets

PREVENTION OF INADVERTENT DATA SYNCHRONIZATION TO AND FROM REMOVABLE MEMORY SOURCES ON A HANDHELD CONNECTED DEVICE

BACKGROUND

1. Field of Art

The present disclosure relates to a handheld connected device and a method of preventing inadvertent data synchronization to and from removable memory sources on a handheld connected device.

2. Description of the Related Art

The use of removable storage media or memory sources on mobile devices is becoming increasingly widespread. Such memory sources include universal serial bus (USB) flash drives (such as Jump drives, Pocket drives, Pen drives, and Thumb drives), Memory Stick (MS) cards, optical disks, external hard drives, Secure Digital (SD) cards (including miniSD and microSD formats), SDIO, CompactFlash (CF) cards, XD cards, PC cards (PCMCIA), and MultiMediaCards (MMCs), among others.

As an example, the SD card format is a very popular flash (non-volatile) memory card format currently in use in various portable devices such as digital cameras, handheld computers, personal digital assistants (PDAs), global positioning system (GPS) units, data organizers, handheld connected devices, and smart phones, among others. The SD card offers a convenient way to add additional memory and storage capability to a mobile device such as a smart phone. Photos stored on a SD card from a digital camera can readily be transferred to a mobile device equipped with a SD card expansion slot. Similarly, videos, movies, games, or other application and data files may also be easily transferred to a mobile device from a SD card. Additionally, irrespective of the ownership of the SD card and files contained within, files stored on any SD card may also be transferred to the local internal storage of a user's mobile device. Data from a removable memory source connected to a user's mobile device may also be transferred to another mobile device, a server based storage, or computer connected to the user's mobile device or over a mobile network or Wireless Local Area Network (WLAN).

Such data transfers may occur through data synchronization technologies that enable automatic copying of data changes between the connected devices so that the data between the devices are in sync. Data synchronization may be either local, wherein the second device is sufficiently proximal to allow a Bluetooth, infrared, or cable connection, or remote, wherein the synchronization occurs over a mobile network or WLAN.

Such flexibility and ease of data transfer from any removable memory source to and from a mobile device comes with several caveats. Firstly, with mobile malware and the use of removable memory sources on the rise, coupled with the fact that most users of removable memory sources have no security policy in place for the contents of their removable memory source, there is a significant security risk associated with such data transfers. Secondly, such removable memory media often contain sensitive, proprietary, personal, or copyrighted information intended only for a limited audience. Hence the entire contents of a removable memory source may not be appropriate for transfer to a mobile device of an arbitrary user of the memory source.

Digital rights management (DRM) technologies are often used to implement access control to memory sources, curtail unrestricted usage of copyrighted data on such memory sources, and to prevent unauthorized copying of data, thereby managing the intellectual property ownership of digital content. However, drawbacks of DRM systems include higher incurred costs (purchase, implementation, and maintenance costs), possibility of malfunction (compatibility or scalability issues in terms of users, digital content, or devices), and often rigid and inflexible control (may not satisfactorily handle multiple file formats and codecs, content associated with multiple applications, or multiple distribution methods for digital content).

Data transfers during a synchronization operation are typically performed in a batch mode, whereby data are either transferred at an arbitrary time upon user instruction or automatically transferred at a designated time established by the user. In a batch transfer mode, digital content on a removable memory source gets transferred to the mobile device only if it happens to be connected to the device at the time of the batch transfer. DRM systems for batch transfers of data from removable memory sources to mobile devices are easier to regulate and hence offer relatively less expensive DRM solutions because a batch mode affords the user better control over what needs to be backed up. To allow such data transfers in real time in a safe manner, the user has to implement expensive DRM solutions which are prohibitive.

It will be appreciated that there are other handheld devices that synchronize data with other removable memory sources, many of which have additional shortcomings in addition to those discussed above.

SUMMARY

The above and other needs are met by a system and a method that prevents inadvertent data synchronization to and from a removable memory source on a handheld connected device, or between the memory source and the device. A system and a method of synchronizing data continuously between a removable memory source and a handheld connected device are disclosed. When a removable memory source is inserted into the device, the device queries the memory source to determine whether the memory source is associated with the device and/or user account. This association may take the form of a memory source identifier that is registered with the device and/or a device identifier that is registered with the memory source. Once a determination is made that the memory source is associated with the device, the memory source is exposed to the device to allow synchronization of data to and from the memory source.

If the memory source is not associated with the device, one aspect of the system and method of synchronizing data continuously to and from a removable memory source on a handheld connected device includes determining if the memory source should be associated with the device. If the memory source should be associated with the device, the memory source and/or the device is configured to associate the memory source with the device. Thereupon, the memory source is exposed to the device to allow synchronization of data to and from the memory source. If the memory source is not to be associated with the device, the memory source is exposed to the device without allowing synchronization of data to and from the memory source.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

Specific embodiments will now be described, by way of example only, with reference to the drawings, in which.

Specific embodiments in accordance with the present disclosure will now be described, by way of example only, with reference to the drawings, in which.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
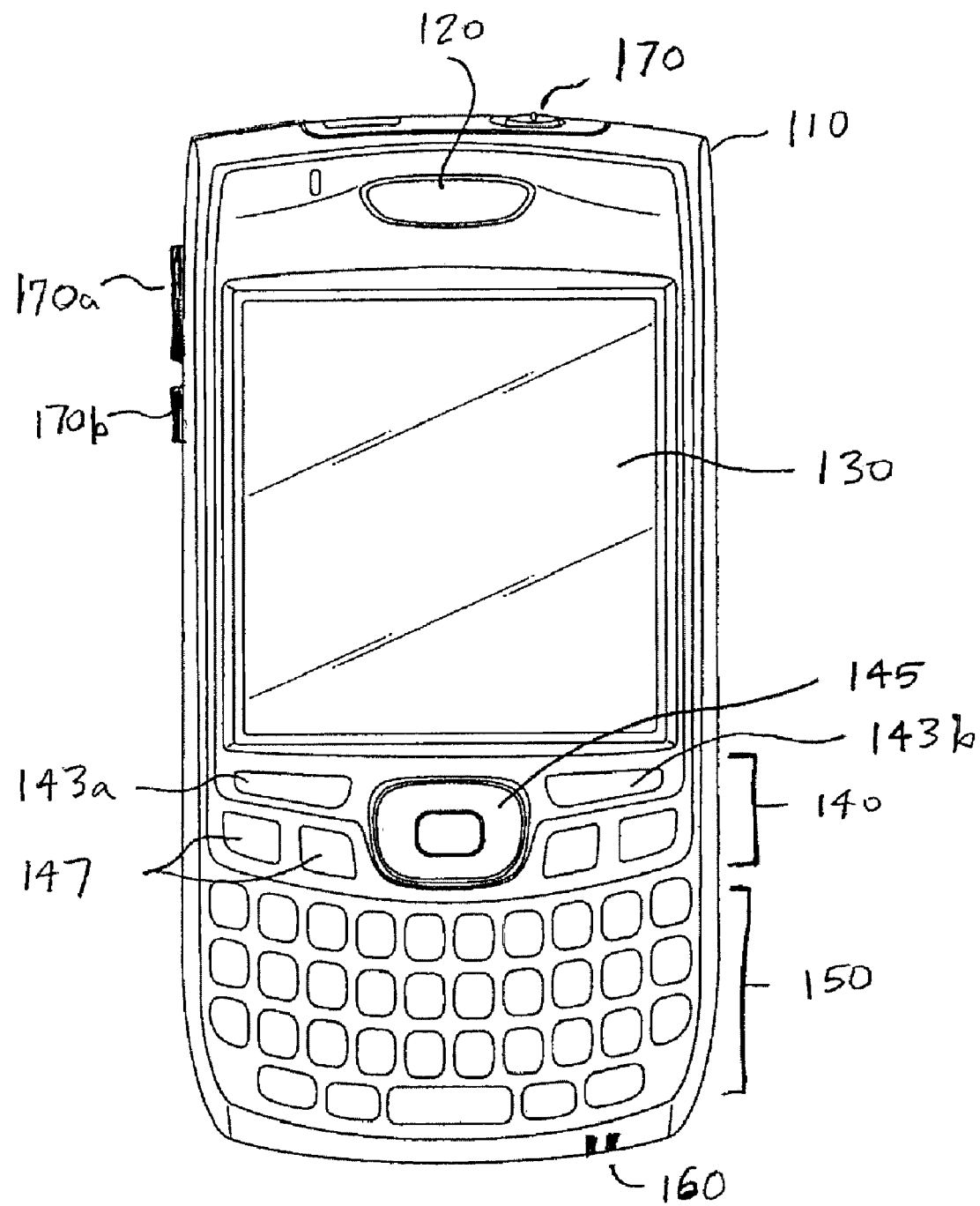
FIG. 1 illustrates one embodiment of a mobile computing device.

FIG. 1 illustrates one embodiment of a mobile computing device 110 with telephonic functionality, e.g., a mobile phone or a smartphone. The mobile computing device is configured to host and execute a phone application for placing and receiving telephone calls. It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) or data networks having voice over internet protocol (VOIP) functionality.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 12.75 centimeters in width, 0.64 to 2.2 centimeters in height and weigh between 55 and 230 grams.

The mobile computing device 110 includes a speaker 120, a screen 130, a navigation area 140, a keypad area 150, and a microphone 160. The mobile computing device 110 also may include one or more switches 170, 170a, 170b (generally 170). The one or more switches 170 may be buttons, sliders, or rocker switches and can be mechanical or solid state (e.g., touch sensitive solid state switch).

The screen 130 of the mobile computing device 110 is, for example, a 240×240, a 320×320, or a 320×480 transflective display. For example, the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 120 further comprises a touch-sensitive display (e.g., pressure-sensitive (resistive), electrically sensitive (capacitative), acoustically sensitive (SAW or surface acoustic wave), photo-sensitive (infrared)) including a digitizer for receiving input data, commands or information from a user. The user may use a stylus, a finger or another suitable input device for data entry, such as selecting from a menu or entering text data.

The navigation area 140 is configured to control functions of an application executing in the mobile computing device 110 and visible through the screen 130. For example, the navigation area includes an x-way (x is e.g., 5) navigation ring 145 that provides cursor control, selection, and similar functionality. In addition, the navigation area 140 may include selection buttons 143a, 143b to select functions viewed just above the buttons on the screen 130. In addition, the navigation area 140 also may include dedicated function buttons 147 for functions such as, for example, a calendar, a web browser, an e-mail client or a home screen. In this example, the navigation ring 145 may be implemented through mechanical, solid state switches, dials, or a combination thereof. The keypad area 150 may be a numeric keypad (e.g., a dialpad) or a numeric keypad integrated with an alpha or alphanumeric keypad 160 (e.g., a keyboard with consecutive keys of QWERTY, AZERTY, or other equivalent set of keys on a keyboard).

Although not illustrated, it is noted that the mobile computing device 110 also may include an expansion slot 125. The expansion slot 125 is configured to receive and support expansion cards (or media cards), which may include memory cards such as CompactFlash™ cards, SD cards, XD cards, Memory Sticks™, MultiMediaCard™, SDIO, and the like.

Figure 2:
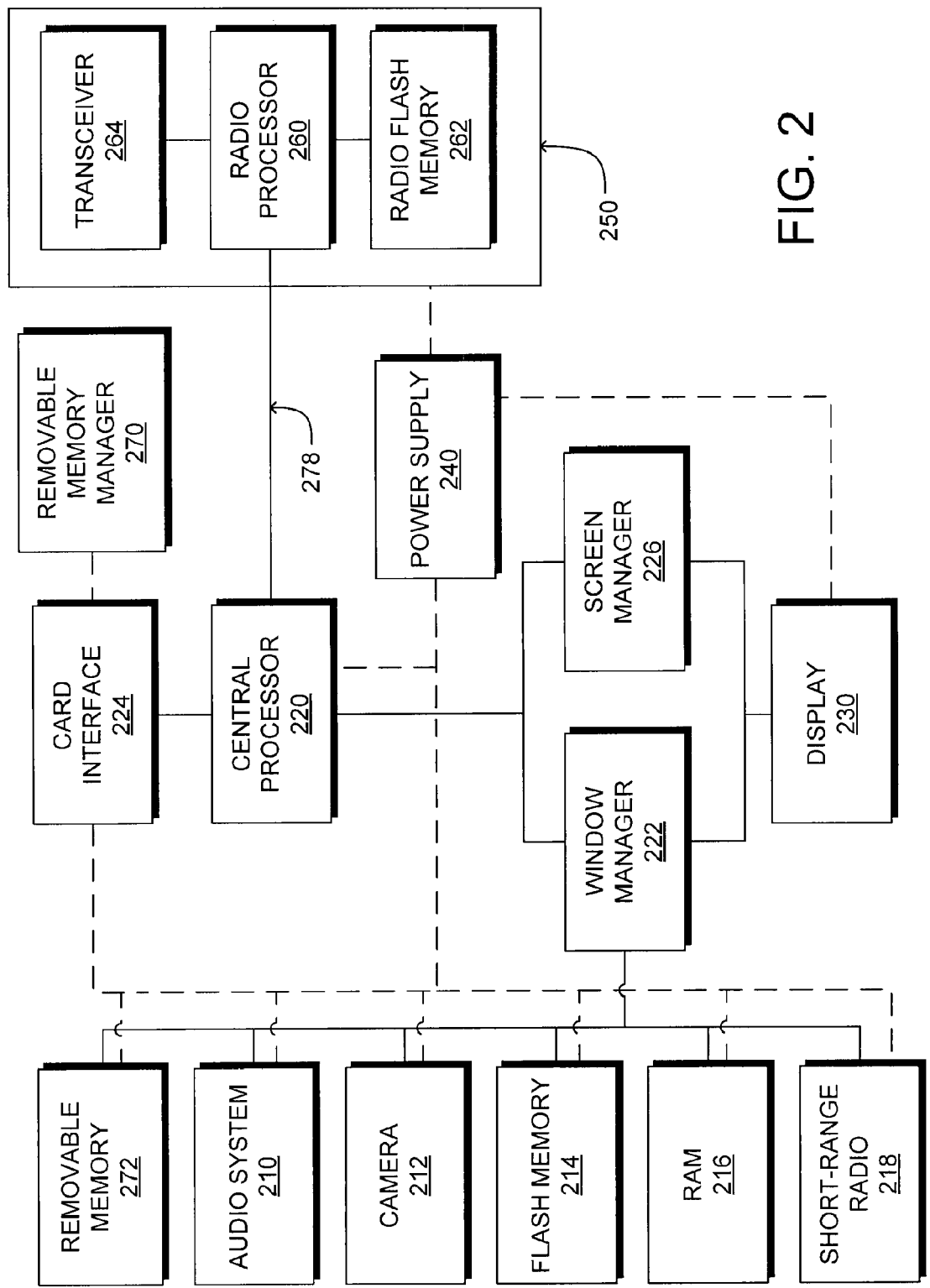
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIG. 1. The mobile computing device 110 includes a central processor 220, a power supply 240, and a radio subsystem 250. The central processor 220 communicates with: audio system 210, camera 212, flash memory 214, RAM memory 216, short range radio module 218 (e.g., Bluetooth, Wireless Fidelity (WiFi) component), removable memory 272 (e.g., SD card), a window manager 222 and a screen manager 226. The power supply 240 powers the central processor 220, the radio subsystem 250 and a display driver 230 (which may be contact- or inductive-sensitive). The power supply 240 may correspond to a battery pack (e.g., rechargeable) or a powerline connection or component.

In one embodiment, the window manager 222 comprises a software or firmware process that initializes a virtual display space stored in the RAM 216 and/or the flash memory 214. The virtual display space includes one or more applications currently being executed by a user and the current status of the executed applications. The window manager 222 receives requests, from user input or from software or firmware processes, to show a window and determines the initial position of the requested window. Additionally, the window manager 222 receives commands or instructions to modify a window, such as resizing the window, moving the window or any other command altering the appearance or position of the window, and modifies the window accordingly. In one embodiment, the window manager generates a dialog window on the screen of the device. In one embodiment, the dialog window the dialog window is configured for displaying prompts during data synchronization.

The screen manager 226 comprises a software or firmware process that manages content displayed on the screen 130. In one embodiment, the screen manager 226 monitors and controls the physical location of data displayed on the screen 130 and which data is displayed on the screen 130. The screen manager 260 alters or updates the location of data on the screen 130 responsive to input from the central processor 220, to modify the screen 130 appearance. In one embodiment, the screen manager 226 also monitors and controls screen brightness and transmits control signals to the central processor 220 to modify screen brightness and power usage to the screen 130.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, multiple Access (CDMA system), and a Universal Mobile Telecommunications System (UMTS). Examples of data networks include General Packet Radio Service (GPRS), third-generation (3G) mobile, High Speed Download Packet Access (HSDPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using a serial line 278.

The card interface 224 is adapted to communicate with the expansion slot 125. The card interface 224 transmits data and/or instructions between the central processor 220 and an expansion card, media card, or removable memory source included in the expansion slot 125. The card interface 224 also transmits control signals from the central processor 220 to the expansion slot 125 to configure an expansion card, media card, or removable memory source included in the expansion slot 125.

The removable memory manager 270 is linked to the card interface 224 and comprises a software or firmware process that manages communication between the card interface 224 and the removable memory 272 included in the expansion slot 125. In one embodiment, the removable memory manager 270 aids the card interface 224 in transmitting data and/or instructions between the central processor 220 and the removable memory 272 included in the expansion slot 125. In one embodiment, the removable memory manager 270 aids the card interface 224 in transmitting control signals from the central processor 220 to the expansion slot 125 to configure the removable memory 272 included in the expansion slot 125.

In one embodiment, central processor 220 executes logic (by way of programming, code, instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

Figure 3:
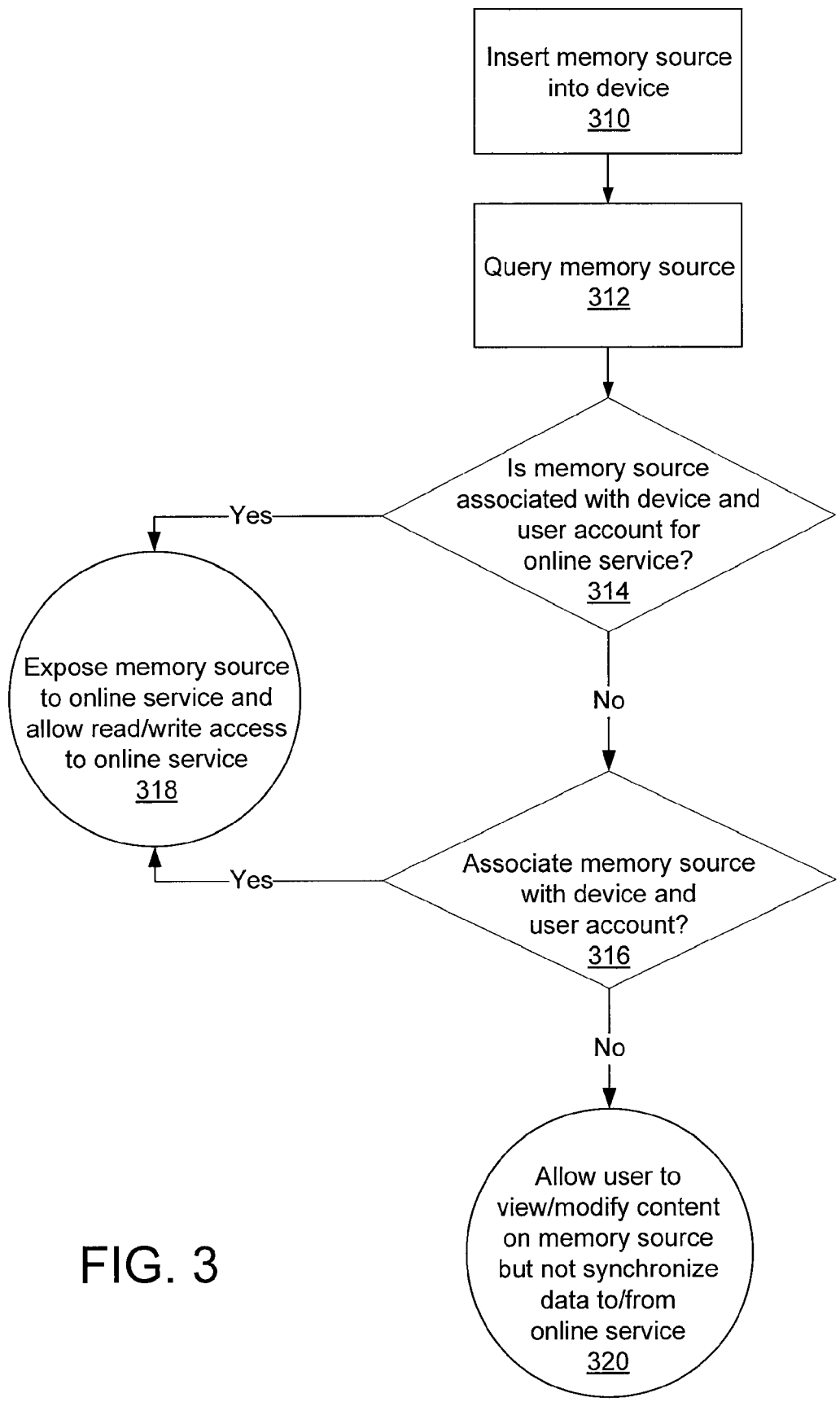
FIG. 3 illustrates one embodiment of a method to prevent inadvertent synchronization of user data to and from removable memory sources.

FIG. 3 illustrates one embodiment of a method to prevent inadvertent synchronization of user data to and from removable memory sources. To initiate the data synchronization process the user of a mobile device inserts 310 a removable memory source (or storage device), for example a SD card, into the device so as to synchronize its contents with an internal memory or storage within the device, a backup server, an online service, a user account on an online service, or combinations thereof. In one embodiment, the device has an extension to the online service subscribed to by the user and the extension may be configured for constantly backing up the data from the device to the online service. In a typical application, photos, pictures, movies, games, data, or other digital media are archived by saving them to the internal memory or online service from the removable memory source. In particular, the system is configured to prevent the synchronization of digital media to the mobile device from removable memory sources other than the user's removable memory source associated with the mobile device or online storage account, unless permitted by the user to do so. The user may insert a non-user's removable memory source to transfer a movie or other digital data to the user's device. When the user inserts that removable memory source in the device this should not initiate a back up of the entire contents of the card on to the user's backup server.

In one embodiment, the user inserts the removable memory source without using real DRM to manage access control on the removable memory source. The device queries 312 the removable memory source to determine whether the removable memory source is associated 314 with the device and user account so the files or other data written to the card is tied to that user's online account, such as a MyPalm™ account configured to synchronize data with a handheld device such as a Treo™ smartphone. Due to a persistent identity when the user is logged on to a server, the client is aware of the user's identity. In one embodiment, the online account backs up the device constantly, such that the data on the device can be restored despite a loss or theft of the device.

If the device determines that the removable memory source is not associated with the user's device or online account, the device prompts the user whether to associate 316 the removable memory source with the user account. In one embodiment, the device displays text in a dialog window on the display 230 to request an action from the user, such as "Detected a removable memory source inserted into this device that is not associated with this user account! Would you like to associate the removable memory source with the online account?" In one embodiment, the display prompt for the above user action is not provided if the device determines that the removable memory source is already associated with the device or online account.

If the user chooses to associate the removable memory source with the device or online account, or if the removable memory source was already associated with the device or online account, the device exposes 318 the removable memory source to the device or online account and further allows read/write access to the online service to facilitate data synchronization with the online service. If the user chooses not to associate the removable memory source with the device or online account, then the device allows 320 the user to view/modify the contents on the removable memory source without affording the rights to synchronize data on the removable memory source with the device or online account.

In one embodiment, the device into which the memory source is inserted, or the associated online account, is configured for consistent synchronization, i.e., the device is constantly backed up. In consistent, real-time backup systems, the data transfer or backup proceeds in a trickle-stream, continuous, and push transfer mode whenever a removable memory source is inserted into the handheld device and the memory source is found to be associated with the device. Unlike conventional systems where the data is loaded in a batch mode, the disclosed system and method beneficially uploads or backs up the data to and from the removable memory source on a handheld device, online account, or backup server connected to the handheld device in a continuous mode, after first determining that the removable memory source is associated with the device, online account, or backup server.

The disclosed system and method has benefits and advantages distinguishable over conventional devices that employ batch transfers of data, wherein the data synchronization happens automatically at a certain user-defined time of day or when the synchronization happens at an arbitrary time of day in response to user instruction. In the latter case where the user initiates the synchronization the user has the option to choose, from among the contents of the memory source, the pertinent data that needs to be synchronized or backed up. However, in the former case where the data synchronization happens automatically at a certain time of day, the user has no control over which of the data on the memory source gets backed up. The unfortunate consequence of this conventional approach is that the entire contents of the memory source will get backed up whenever a memory source is inserted into the handheld device. This automatic backup of the entire contents of a memory source is undesirable for many reasons. Firstly, the memory source may predominantly contain older version of the data and the user is only seeking to backup selected files. Secondly, the user may wish to backup selected data from a memory source borrowed from a non-user, i.e. a memory source that is not associated with the handheld device.

In contrast, the disclosed system and method offers greater control over data management. For example, a user may store personal digital pictures on a removable memory source, e.g. a SD card, and a non-user seeks to backup selected pictures on to the non-user's handheld device. In such a situation, when the non-user is only seeking to perform a one-off operation, it is undesirable and unnecessary for the entire contents of the removable memory source to be transferred to the non-user's device. Content that is distributed on removable memory sources, such as movies and games, most likely has DRM associated with it. In such situations, automatic transfers of such DRM-protected files may result in the download of Binary Large Object (BLOB) files, which is undesirable. Avoiding the unnecessary backup of irrelevant files also limits data traffic and the costs associated with unnecessary data traffic. There are also security implications in associating removable memory sources with handheld devices. The removable memory source may have associated with it a high-level key indicating that the card is associated with a different handheld device and access to the removable memory source may only be permitted upon successful entry of a password.

It will be appreciated that any of the examples of data synchronization options discussed above can be used with this embodiment, and that any of the optional features of any of the embodiments described herein could also be provided with one or more of any of the other embodiments described herein.

In view of the foregoing description it will be evident to a person skilled in the art that various modifications may be made within the scope of the disclosure. For example, the data synchronization or backup may proceed from the device, or the online account associated with the device, to the memory source.

Insofar as embodiments described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present disclosure. For example, the processor described with respect to FIGS. 1 and 2 may be embodied as instructions of a computer program. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. These instructions may be executable by a processor. A skilled person would readily understand that term "computer" in its most general sense encompasses programmable devices such as referred to above, and data processing apparatus and computer systems.

Suitably, the computer program is stored on a carrier (or tangible computer readable) medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identify module, tape, cassette solid-state memory. The computer program may be supplied from a remote source embodied in the communications medium such as an electronic signal, radio frequency carrier wave or optical carrier waves. Such carrier media are also envisaged as aspects of the present disclosure.

It will be appreciated that any of the application programs, or any other logical module, may be made up of more than one functional unit that may be distributed across more than one server/computer. The one or more server computers may or may not be in the same physical location.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and method of synchronizing data continuously between a removable memory source and a handheld connected device through the disclosed principles herein. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method of managing data in a removable memory source at a mobile computing device, the method comprising:
   coupling the removable memory source, the removable memory source not having data processing capability;
   querying data stored in the removable memory source for presence of a key associated with another mobile computing device;
   determining whether the mobile computing device is authorized to access the removable memory source responsive to detecting the presence of the key associated with the other mobile computing device;
   querying data stored in the removable memory source for presence of a memory source identifier associated with the mobile computing device responsive to not detecting the presence of the key or determining presence of the authority to access the removable memory source, the memory source identifier representing association of backup data in the removable memory source with data in the mobile computing device, the memory source identifier generated by the mobile computing device;
   automatically synchronizing the backup data in the removable memory source with data in the mobile computing device responsive to detecting the memory source identifier associated with the mobile computing device; and
   accessing data in the removable memory source except the backup data responsive to not detecting the memory source identifier associated with the mobile computing device, and responsive to not detecting the key associated with the other mobile computing device or determining that the mobile computing device is authorized to access the removable memory source.

2. The method of claim 1, further comprising:
   determining whether the removable memory source should be associated with the mobile computing device, responsive to determining that the removable memory source is not associated with the mobile computing device; and
   associating the removable memory source with the mobile computing device by registering the memory source identifier with the mobile computing device responsive to a determining that the removable memory source should be associated with the mobile computing device.

3. The method of claim 2, wherein determining whether the mobile computing device is authorized to access the removable memory source, comprises:
   receiving a personal identification number or a password; and
   determining whether the personal identification number or the password corresponds to the key.

4. The method of claim 1, further comprising querying an online service subscribed to by a user of the mobile computing device for the memory source identifier.

5. The method of claim 1, wherein the removable memory source comprises one of a solid state memory device or a magnetic memory device.

6. A mobile computing device configured to store data in a removable memory source, comprising:
   an interface for coupling with the removable memory source, the removable memory source not having data processing capability;
   a processor coupled to the interface for storing data in the removable memory source or retrieving data from the removable memory source; and
   a computer readable storage medium coupled to the processor, the computer readable storage medium storing instructions when executed by the processor cause the processor to:
   query data stored in the removable memory source for presence of a key associated with another mobile computing device;
   determine authority to access the removable memory source responsive to detecting the presence of the key associated with the other mobile computing device;
   query data stored in the removable memory source for presence of a memory source identifier associated with the mobile computing device responsive to not detecting the presence of the key or determining whether the mobile computing device is authorized to access the removable memory source, the memory source identifier representing association of backup data in the removable memory source with data in the mobile computing device, the removable memory source identifier generated by the mobile computing device;

automatically synchronize the backup data in the removable memory source with data in the mobile computing device responsive to detecting the memory source identifier associated with the mobile computing device; and access data in the removable memory source except the backup data responsive to not detecting the memory source identifier associated with the mobile computing device, and responsive to not detecting the key associated with the other mobile computing device or determining that the mobile computing device is authorized to access the removable memory source.

7. The mobile computing device of claim 6, wherein the computer readable storage medium further stores instructions to:

determine whether the removable memory source should be associated with the mobile computing device, responsive to determining that the removable memory source is not associated with the mobile computing device; and associate the removable memory source with the mobile computing device by registering the memory source identifier with the mobile computing device responsive to determining that the removable memory source should be associated with the mobile computing device.

8. The mobile computing device of claim 7, wherein the instructions to determine whether the removable memory source should be associated with the mobile computing device comprises instructions to:

receive a personal identification number or a password;

determine whether the personal identification number or the password corresponds to the key.

9. The mobile computing device of claim 6, wherein the computer readable storage medium further stores instructions to query an online service subscribed to by a user of the mobile computing device for the memory source identifier.

10. The mobile computing device of claim 6, wherein the removable memory source comprises one of a solid state memory device or a magnetic memory device.

11. A tangible computer readable storage medium storing instructions thereon, the instructions when executed by a processor in a mobile computing device causing the processor to:

detect a removable memory source inserted into the mobile computing device;

query data stored in the removable memory source for presence of a key associated with another mobile computing device;

determine whether the mobile computing device is authorized to access the removable memory source responsive to detecting the presence of the key associated with the other mobile computing device;

query data stored in the removable memory source for presence of a memory source identifier associated with the mobile computing device responsive to not detecting the presence of the key or determining presence of the authority to access the removable memory source, the memory source identifier representing association of backup data in the removable memory source with data in the mobile computing device, the memory source identifier generated by the mobile computing device;

automatically synchronize the backup data in the removable memory source with data in the mobile computing device responsive to detecting the memory source identifier associated with the mobile computing device; and access data in the removable memory source except the backup data responsive to not detecting the memory source identifier associated with the mobile computing device, and responsive to not detecting the key associated with the other mobile computing device or determining that the mobile computing device is authorized to access the removable memory source.

12. The computer readable storage medium of claim 11, further comprising instructions that cause the processor to:

determine whether the removable memory source should be associated with the mobile computing device, responsive to determining that the removable memory source is not associated with the mobile computing device; and associate the removable memory source with the mobile computing device by registering the memory source identifier with the mobile computing device responsive to a determination that the removable memory source should be associated with the mobile computing device.

13. The computer readable storage medium of claim 12, further comprising instructions that cause the processor to:

receive a personal identification number or a password; and determine whether the personal identification number or the password corresponds to the key.

14. The computer readable storage medium of claim 11, wherein the instructions further comprising instructions that cause the processor to query an online service subscribed to by a user of the mobile computing device for the memory source identifier.

15. The computer readable storage medium of claim 11, wherein the removable memory source comprises one of a solid state memory device or a magnetic memory device.

* * * * *

UNITED STATES PATENT AND TRADEMARK OFFICE
CERTIFICATE OF CORRECTION

PATENT NO.       : 7,574,535 B2                                    Page 1 of 1
APPLICATION NO.  : 11/849223
DATED            : August 11, 2009
INVENTOR(S)      : Jeffrey Finkelstein It is certified that error appears in the above-identified patent and that said Letters Patent is hereby corrected as shown below:

Column 10, Claim 2, line 29, please delete "a" before "determining".

Signed and Sealed this

Twenty-seventh Day of October, 2009

David J. Kappos
*Director of the United States Patent and Trademark Office*